United States Patent [19]
Shibuya

[11] Patent Number: 5,652,675
[45] Date of Patent: Jul. 29, 1997

[54] TWO-WAY REPEATER EMPLOYING OPTICAL AMPLIFICATION

[75] Inventor: Takashi Shibuya, Tokyo, Japan

[73] Assignee: NEC Corporation, Japan

[21] Appl. No.: 500,568

[22] Filed: Jul. 11, 1995

Related U.S. Application Data

[63] Continuation of Ser. No. 954,329, Sep. 30, 1992, abandoned.

[30] Foreign Application Priority Data

Sep. 30, 1991 [JP] Japan .................. 3-252524

[51] Int. Cl.$^6$ .................. H01S 3/091; H04B 10/16; G02B 6/26
[52] U.S. Cl. .................. 359/341; 359/176; 359/344
[58] Field of Search .................. 359/124, 174, 359/176, 177, 341, 344

[56] References Cited

U.S. PATENT DOCUMENTS

| | | | |
|---|---|---|---|
| 4,867,518 | 9/1989 | Stamnitz et al. | 359/341 |
| 4,972,513 | 11/1990 | Mochizuki et al. | 455/601 |
| 5,136,420 | 8/1992 | Inagaki et al. | 359/341 |
| 5,231,529 | 7/1993 | Kaeda | 359/124 |

FOREIGN PATENT DOCUMENTS 535590   7/1993   European Pat. Off. .

OTHER PUBLICATIONS

Barnard et al, IEEE Photonics Letters, vol. 4, #8, Aug. 1992, pp. 911–913.
Masafumi et al, Conf. Laser Electr. Opt. pp. 424–425, Apr. 24, 1989; Abst. only provided herewith.

*Primary Examiner*—Nelson Moskowitz
*Attorney, Agent, or Firm*—Ostrolenk, Faber, Gerb & Soffen, LLP

[57] ABSTRACT

A two-way repeater apparatus for directly amplifying optical signals, to be transmitted in mutually opposite directions, with little distortion by directly exciting laser media. An outward optical signal passes a first set of ports of a first optical circulator, is amplified by an Er ion-doped optical fiber, and further passes a first set of ports of a second optical circulator to become an outward output optical signal. Meanwhile, an inward optical signal passes another set of ports of the second optical circulator, is amplified by another Er ion-doped optical fiber, and further passes another set of ports of the first optical circulator to become an inward output optical signal.

15 Claims, 5 Drawing Sheets

TWO-WAY REPEATER EMPLOYING OPTICAL AMPLIFICATION

BACKGROUND OF THE INVENTION

This is a continuation of application Ser. No. 07/954,329, filed on Sep. 30, 1992, now abandoned.

1. Field of the Invention

The present invention relates to a two-way repeater for use in optical fiber communication systems, and more particularly to a two-way repeater including a laser medium by directly amplifying two optical signals, transmitted in mutually reverse directions over one optical fiber or one semiconductor laser, by optically exciting the fiber or the laser.

2. Description of the Related-Art

One two-way repeater of this kind using optical amplification is disclosed in a Japanese Patent Publication Gazette (title of the invention: two-way optical amplifier; publication number: Hei 3-194518: publication date: Aug. 26, 1991; Japan). This two-way repeater amplifies outward optical signals of 1.52 to 1.56 microns in wavelength transmitted from a first input/output terminal to a second input/output terminal (in the outward direction) with a laser-active optical fiber obtained by doping a quartz-based optical fiber with rare earth elements, such as erbium and neodymium, and amplifies inward optical signals of said wavelength transmitted in the inward direction with an optical fiber doped with the same rare earth elements. This two-way repeater includes two optical circulators for separating said inward and outward optical signals and a plurality of optical filters for cutting off pumping light and Amplified Spontaneous Emission (ASE) in addition to one or more of said active optical fiber. Said optical fiber here is excited by pumping light of 1.45 to 1.50 microns in wave length. Details of the configuration and operation of this two-way repeater will be given in later paragraphs.

In the aforementioned two-way repeater, said optical filters which much reflects optical signals are connected to the amplification output end of said active optical fiber, and there occurs multiple reflection of said first and second optical signals between said optical filters and other constituent elements including said rare earth-doped optical fiber. As a result, in said two-way repeater, oscillation, or substantial signal distortion if not oscillation as such, is induced by said optical signals to obstruct the normal transmission of these optical signals.

With said two-way repeater, since it simultaneously amplifies said first and second optical signals (inward and outward optical signals) with the same active optical fiber, it is difficult to separately control the degrees of amplification and outputs of said first and second optical signals in accordance with the specific requirements of a given optical fiber communication system and accordingly to produce a flexible optical fiber communication system.

SUMMARY OF THE INVENTION

Objects off the Invention

Therefore, a first object of the present invention is to provide an optical amplifier based two-way repeater apparatus capable of achieving direct amplification of optical signals by the optical excitation of a laser-active optical fiber or the excitation of a semiconductor laser without inviting signal deterioration by oscillation or multiple reflection.

A second object of the invention is to provide an optical amplifier based two-way repeater apparatus capable of controlling such optical amplification parameters as the degree of amplification and saturation output separately for inward and outward optical signals.

Summary of the Invention

An optical amplifier based two-way apparatus according to the invention supplies a first optical signal from a first signal input/output terminal (an outward optical signal) to a second port of a first optical circulator, and amplifies said first optical signal generating at a third port of this optical circulator with a first optical amplifying medium. This amplified first optical signal is supplied to a first port of a second optical circulator, and further generates at a second signal input/output terminal connected to a second port of this second optical circulator to become the outward output optical signal of this two-way repeater apparatus. On the other hand, a second optical signal from said second signal input/output terminal (an inward optical signal) is supplied to the second port of said second optical circulator, and said second optical signal generating at a third port of this second optical circulator is amplified by a second optical amplifying medium. This amplified second optical signal is supplied to a first port of said first optical circulator, and further generates at said second signal input/output terminal connected to the second port of this first optical circulator to become the inward output optical signal of this two-way repeater apparatus.

Said first and second optical amplifying media are composed either of active optical fibers, prepared by doping optical fibers with a rare earth element such as erbium, or of semiconductor laser amplifiers. Were these optical amplifying media are active optical fibers, a pumping light is supplied by optical means to said active optics fibers. Or, where said optical amplifying media are semiconductor laser amplifiers, an current is supplied to the semiconductor laser elements which are the optical amplifying elements of these amplifiers.

BRIEF DESCRIPTION OF THE DRAWINGS

The above-mentioned and other objects, features and advantages of the present invention will become more apparent from the following detailed description when taken in conjunction with the accompanying drawings, wherein.

DETAILED DESCRIPTION OF THE PREFERRED EMBODIMENT

Figure 1:
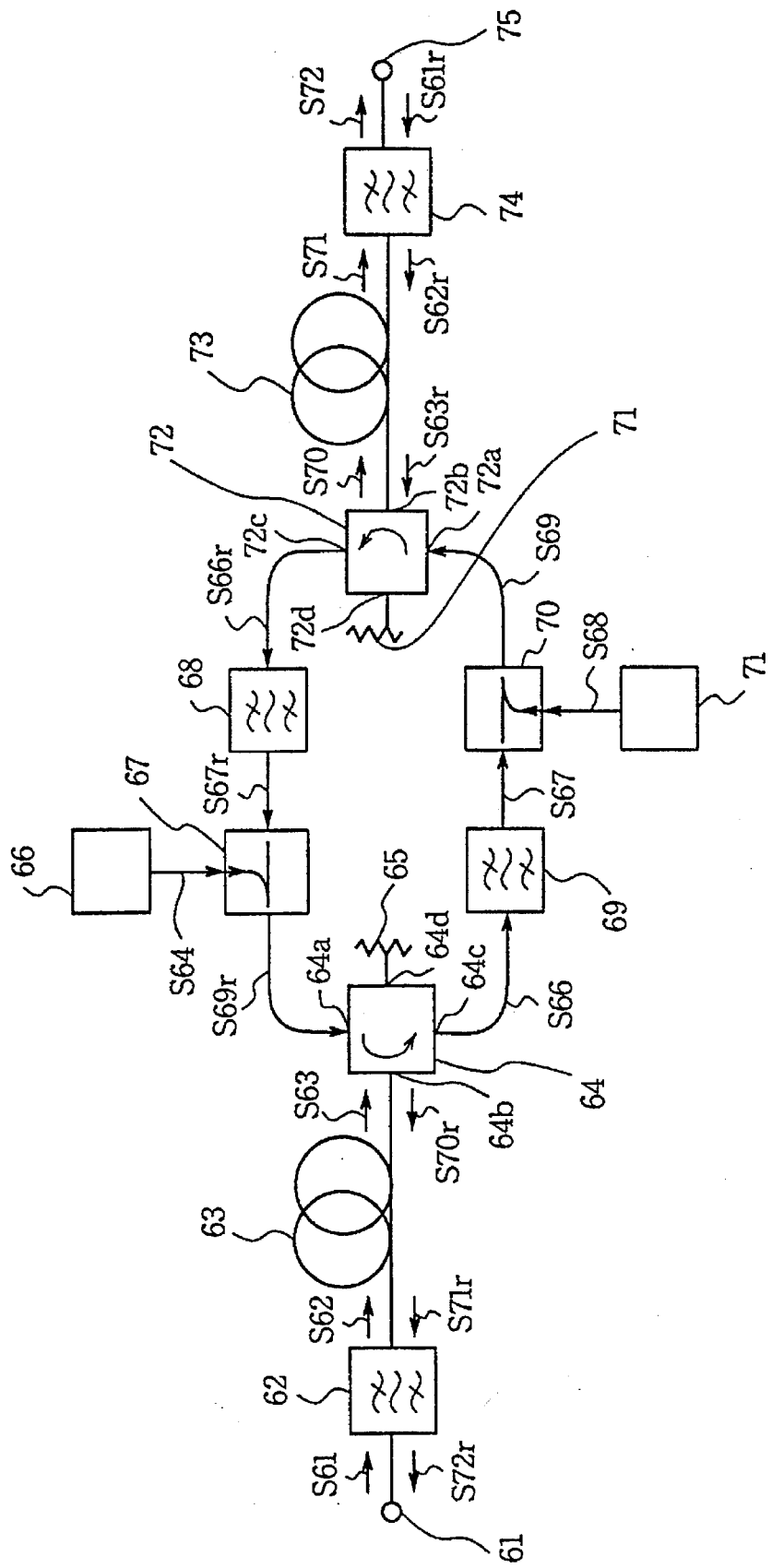
FIG. 1 is a block diagram of a two-way repeater according to the prior art.

Referring to FIG. 1, this two-way repeater using optical amplification is disclosed in the above cited Japanese Patent Publication Gazette. This two-way repeater amplifies an outward input optical signal S61, received at an input/output terminal 61, with active optical fibers 63 and 73, and generates an outward output optical signal S72, after the amplification of the optical signal S61, at another input/output terminal 75. Meanwhile, an inward input optical signal S61r, received at the input/output terminal 75, is amplified by the active optical fibers 73 and 63, and an inward output optical signal S72r, after the amplification of the optical signal S61r, is generated at the input/output terminal 61. Here, suffix r indicates the inward direction of the optical signal.

First to describe the operation to amplify the outward optical signal in this two-way repeater, the outward input optical signal S61 is supplied to the active optical fiber 63 via an optical filter 62, and the optical fiber 63 amplifies the optical signal S61 into an optical signal S63. The optical fiber 63 here is excited by a pumping light S64 supplied from a pumping light source 66 via an optical multiplexer 67 and a four-port optical circulator 64, and inversively distributed. The optical signal S63 is supplied to a port 64b of the optical circulator 64, emerges at its port 64c (an optical signal S66), and is further supplied to an optical filter 69. The optical filter 69 cuts off the pumping light S64, which is reflected by the optical filter 62 and proceeds backward along the active optical fiber 63, and an ASE generating in the optical fiber along with the excitation by the pumping light S64, extracts from the optical signal S66 an optical signal S67, which is an amplified component of the outward optical signal S62, and causes it to emerge at the output end.

The optical signal S67 and a pumping light S68 from a pumping light source 71 are multiplexed by an optical multiplexer 70, and a multiplexed optical signal S69 is supplied to the active optical fiber 73 via ports 72a and 72b of a four-port optical circulator 72 (an optical signal S70). The active optical fiber 73 is excited by the pumping light S68 component of the optical signal S70, and generates an optical signal S71 by amplifying its optical signal S67 component. The optical signal S71 undergoes a cut-off by an optical filter 74 of the pumping light S68 component and of an ASE generating in the active optical fiber 73 along with the excitation by the exciting light S68 component, and an optical signal S72, resulting from the extraction of an amplified component of the optical signal S67 from the optical signal 71, generates at the input/output terminal 75.

The operation to amplify an inward optical signal is no different from that to amplify an outward optical signal.

The optical signal S61r received at the input/output terminal 75 is amplified by the active optical fiber 73 via the optical filter 74 (an optical signal S63r). This amplified optical signal S63r passes the ports 72b and 72c of the optical circulator 72 and an optical filter 68 (an optical signal S67r). The optical signal S67r and the pumping light S64 from the pumping light source 66 are multiplexed by the optical multiplexer 67. The resultant multiplexed optical signal S69r is supplied to the active optical fiber 63 via the ports 64a and 64b of the optical circulator 64 (an optical signal S70r). The active optical fiber 63 is excited by the pumping light S64 component of the optical signal S70r, and amplifies the optical signal S67r component to generate an optical signal S71r. The optical signal S71r is supplied to the optical filter 62, which cuts off the pumping light S64 component and an ASE generating in the active optical fiber 63 along with the excitation by the pumping light component S64, extracts from the optical signal S71r an optical signal S72r, which results from the amplification of the optical signal S67r component, and causes it to emerge at the input/output terminal 61.

The optical filters 62 and 74 here, which usually are narrow-band filters consisting of dielectric multi-layer films, let the optical signals S72 and S72r pass but cut off the pumping light S64 and S68 components out of the optical signals S7 and S71r, respectively, and have relatively high reflectances at the wavelengths of the optical signals S72 (and S62) and S71r (and S62r) as well. Therefore, if these optical filters 62 and 74 are directly connected to the amplification input or output ends of the active optical fibers 63 and 73, the optical signals S71 and S71r and the pumping lights S64 and S68 undergo high multiple reflection at these connection points. This multiple reflection subjects the optical signals S71 and S71r to oscilation and substantial distortion, and thereby obstructs the normal transmission of optical signals by this two-way repeater.

In this two-way repeater, the optical circulators 64 and 74 are four-terminal circulators, and their respective fourth ports 64d and 72d are terminated by optical terminators 65 and 71, respectively. Their constituent elements are optically connected to one another either directly or via optical fibers.

As stated above, this two-way repeater simultaneously amplifies the optical signals S62 and S70r, transmitted in mutually opposite directions, with the same active optical fiber 63, and the optical signals S62r and S70 with the active optical fiber 73. Therefore it is difficult to separately control the degrss of amplification and the output levels of the inward and outward optical signals, which are simultaneously amplified, in accordance with the requirements of the optical fiber communication system.

Figure 2:
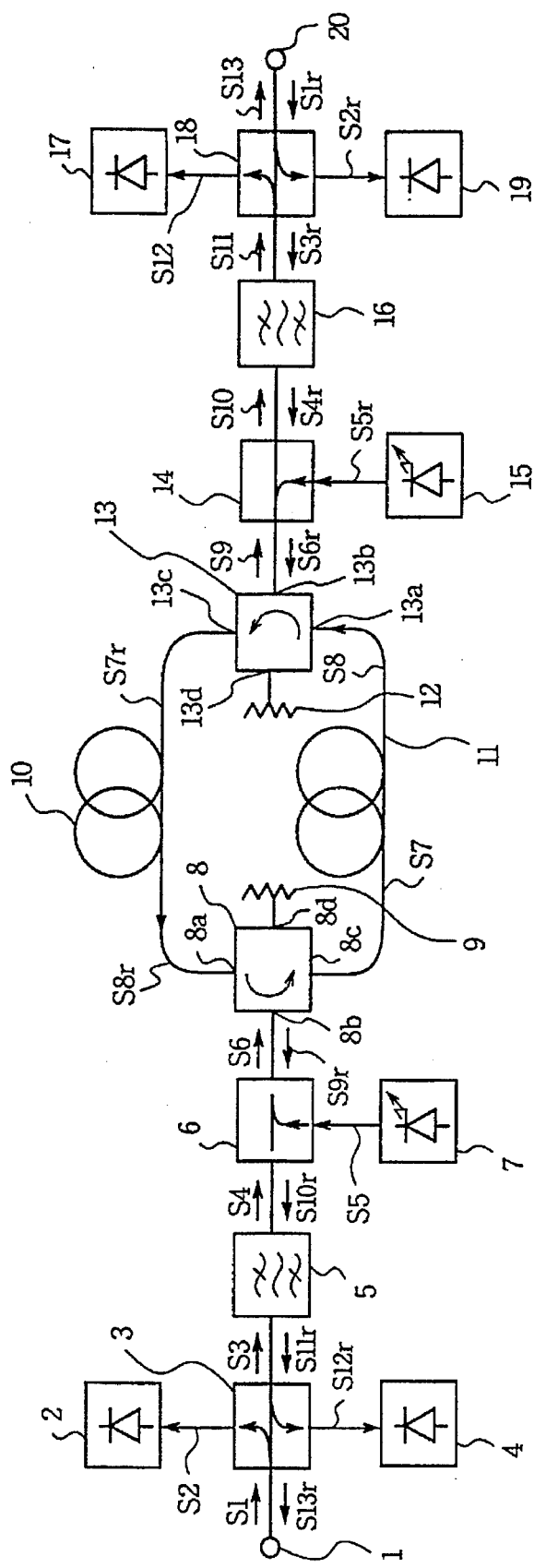
FIG. 2 is a block diagram of one preferred embodiment of the present invention.

Referring to FIG. 2, an optical amplifier based two-way repeater 101 receives an outward input optical signal S1 of 1.552 microns in wavelength at an input/output terminal 1, amplifies an optical signal S7 deriving from said optical signal S1 with an optical fiber 11 doped with erbium (Er) ions, and causes an optical signal S13 deriving from this amplified optical signal S8 to generate at another input/output terminal 20. Further this two-way repeater receives an inward optical signal S1r of 1.536 microns in wavelength at the input/output terminal 20, amplifies an optical signal S7r deriving from said optical signal S1r with the optical fiber 10 doped with Er ions, and causes an optical signal S13r deriving from this amplified optical signal S8r to generate at the input/output terminal 1. Zero, suffix r indicates the inward direction of the optical signals.

First to describe the operation to amplify and process outward optical signals, this two-way repeater 101 receives the outward optical signal S1 at the input/output terminal 1, and supplies it to an optical branching circuit 3 including an optical directional coupler. The optical branching circuit 3 branches out an optical signal S2, which is a part of the optical signal el, to an optical power monitor 2 including an optical detecting element such as a photodiode, and supplies an optical signal S3, which comprises the predominant remaining part of the optical signal S1, to an optical filter 5 consisting of a dielectric multi-layer film or the like. The optical power monitor 2 converts the optical signal S2 into an electric signal to monitor the state of the Outward input optical signal S1, which is supplied to this two-way repeater 101, such as the level of the optical signal S1. Since the optical filter 5 transmits lights of the 1.55-micron band including wavelengths of 1.536 and 1.552 microns and cuts off lights of the 1.48-micron wavelength band, the optical signal S3 passes the optical filter 5 to be supplied to an optical multiplexer 6 (an optical signal S4). This optical signal S4 and a pumping light S5 of 1.48 microns in wavelength, generated from a pumping light source 7 including a laser oscillator, are multiplexed by the optical multiplexer 6. The resultant multiplexed optical signal S6 is supplied to a port 8b of a four-port optical circulator 8, and emerges at its port 8c (an optical signal S7).

Out of this optical signal S7, the pumping light S5 component excites the electronic state of the Er ion-doped optical fiber 11 into inversive distribution, and the optical fiber 11 amplifies the optical signal S4 component in this excited state. An amplified optical signal S8 from the Er ion-doped optical fiber 11 is supplied to a port 13a of a four-port optical circulator 13, and emerges at its port 3b (an optical signal S9). The optical signal S9 passes an optical multiplexer 14, and is supplied to an optical filter 16 (an optical signal S10). The optical multiplexer 14 multiplexes the inward optical signal S10, to be described in further detail below, and a pumping light S5r of 1.48 microns in wavelength, which excites an Er ion-doped optical fiber 10. The optical filter 16 cuts off the pumping light S5 in the optical signal and an ASE generating in the Er ion-doped optical fiber 11, extracts an optical signal S11 resulting from the amplification of the optical signal S4 component, and causes it to emerge at an output terminal. This optical signal S11 is supplied to an optical branching circuit 18. The optical branching circuit 18 branches out an optical signal S12, which is a part of the optical signal S11, to an optical power monitor 17, and causes the predominant remaining part of the optical signal S11 as an optical signal S13 to emerge at the input/output terminal 20. The optical power monitor 17 converts the optical signal S12 into an electric signal, and monitors the operating state of this two-way repeater 101 with respect to outward input optical signals, such as the level of the outward optical signal S13 (or the optical signal S11).

This two-way repeater 101, using the optical multiplexers 6 and 14, the optical branching circuits 3 and 18 and the optical filters 5 and 16, all of 1 dB in passing loss, the optical circulators 8 and 13 of 2 dB in passing loss, and the Er ion-doped optical fiber 10 of 80% in conversion efficiency, amplifies the optical signal S of −20 dBm into the optical signal S13 of +10 dBm if the level of the pumping light S5 is set at +20 dBm.

In this two-way repeater 101, the operation to amplify and process an inward optical signal is no different from that to amplify and process an outward optical signal.

A part of an inward input optical signal S1r is branched out by the optical branching circuit 18 to an optical power monitor 19, and an optical signal S3r, which is the predominant remaining part of the optical signal S1r, is supplied to the optical filter 16. The optical power monitor 19 monitors the state of the inward input optical signal S1r entered into this two-way repeater, such as its level. An optical signal S3r passes the optical filter 16 (an optical signal S4r), and this optical signal S4r and a pumping light S5r of 1.48 microns in wave length, generated by the pumping light source 15, are multiplexed by the optical multiplexer 14. The resultant multiplexed optical signal S5r is supplied to the port 13b of the optical circulator 13, and emerges at its port 13c (an optical signal S7r).

The pumping light S5r component of this optical signal S7r excites the electronic state of the Er ions in active optical fiber 10 into inversive distribution, and the optical fiber 10 amplifies the optical signal S4r component in this excited state. An amplified optical signal S5r from the Er ion-doped optical fiber 10 is supplied to the port 8a of the optical circulator 8, and emerges at its port 8b (an optical signal S9r). The optical signal S9r is supplied via the optical multiplexer 6 to the optical filter 5 (an optical signal S10r). The optical filter 16 cuts off the pumping light S5r component of the optical signal S10r and an ASE generating in the Er ion-doped optical fiber 10, extracts an optical signal S11r resulting from the amplification of the optical signal S4r component, and causes it to emerge at the output terminal. This optical signal S11r is supplied to the optical branching circuit 3, and an optical signal S12r, which is a part of the optical signal S11r, is supplied to an optical power monitor 4, while the predominant remaining part of the optical signal S11r is caused to emerge at the input/output terminal 1 as an inward output optical signal S13r. The optical power monitor 4 monitors the operating state of this two-way repeater 101 with respect to inward input optical signals, such as the level of the inward optical signal S11r. The monitoring output of this monitor 4 and of the aforementioned monitors 2, 17 and 19 are used for sending out an alarm from this two-way repeater 101 and controlling its pumping power sources 7 and 15 (accordingly controlling the levels of the exciting lights S5 and S5r).

In this two-way repeater 101, since the port 8d of the four-port optical circulator 8 and the port 13d of the four-port optical circulator 13 do not actively contribute to the amplifying operation by this amplifier 101, they are terminated by respectively connecting optical terminators 9 and 12 to them. There will be virtually no difference in the functions of this two-way repeater 101 if these four-port optical circulators 8 and 13 are replaced with three-port circulators having no ports 8d and 13d, respectively.

The two-way repeater 101 of FIG. 2, since both ends of its Er ion-doped optical fibers 10 and 11 are connected to highly unreflective optical circulators 8 and 13, respectively, has the advantage that the optical signals S7, S7r, S8 and S8r and the exciting light S5 and S5r components are subject to no multiple reflection and the amplified optical signals S8 and S8r free from distortion. Thus, to take up outward optical signals for example, as the reflected component of the outward optical signal S9, reflected by the optical multiplexer 14, the optical filter 16 and the optical branching circuit 18, goes from the port 13b of the optical circulator 13 to its port 13c after moving back through the optical multiplexer 14 but does not return to the optical fiber 11, it is subject to no multiple reflection. The same is true with inward optical signals. The optical fibers 10 and 11 amplify the inward optical signal S7r and the outward optical signal S7 with separate amplifying media. Accordingly, this two-way repeater 101 permits the gains and the saturation outputs of the inward and outward optical signals to be separately varied to meet the requirements of the optical fiber communication system, and thereby provides greater flexibility to system architecture.

While the two-way repeater 101 of FIG. 2 uses Er ion-doped optical fibers as amplifying media for optical signals, the general principle is to use optical fibers doped with a suitable rare earth element for the wavelength of the optical signals to be amplified. For instance, optical fibers doped with praseodymium (Pr) ions or with neodymium (Nd) ions are used for amplifying optical signals in the 1.3-micron wavelength band.

Figure 3:
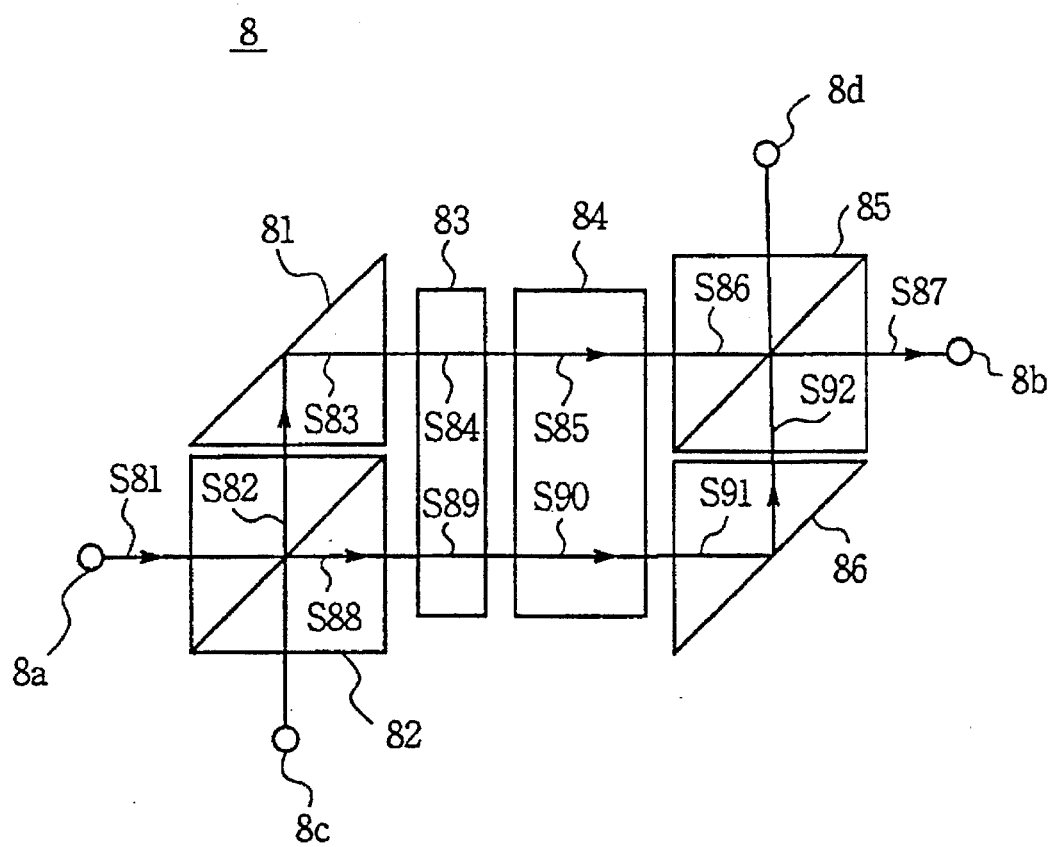
FIG. 3 is a diagram illustrating the configuration of the optical circulator 8 contained in the block diagram of FIG. 2.

Referring now to FIG. 3, if an unpolarized optical signal SB1 is inputted to the port 8a of the four-port optical circulator 8, which is well known to persons skilled in the art, an optical signal S87, also unpolarized, will generate at its port 8b, In this optical circulator 8, similarly to what was stated above, an optical signal inputted to the port 8b emerges at the port 8c, one inputted to the port 8c emerges at the port 8d, and one inputted to the port 8d emerges at the port 8a, thus in a circulatory process in the alphabetical order of the suffix.

To describe the operation of this optical circulator 8 in further detail, the optical signal S81 coming incident on the port 8a (one face of a polarizing beam splitter 82) is branched into an optical signal S82 of an S-polarized beam (whose polarizing direction is vertical to the plane of incidence) which turns at a right angle in the polarizing beam splitter 82 and an optical signal S88 of a P-polarized beam (whose polarizing direction is parallel to the plane of incidence) which moves straight ahead in the polarizing beam splitter 82. The signal S83 is further reflected by a right-angle prism 81 and supplied to a Faraday rotator 83 (a signal S84). This signal S84, whose plane of polarization is rotated 45° in the forward direction by the Faraday rotator 83, comes incident on a polarization plane rotator 84 (a signal S85). The signal S85, whose plane of polarization is rotated 45° reciprocally by the Faraday rotator 83, becomes a signal S86 of a P-polarized beam at the emitting end of the polarization plane rotator 84. The signal S86, as it is a signal of a P-polarized beam, moves straight ahead in a polarizing beam splitter 85, and all its signal components emerge at the port 8b, but none at the port Meanwhile the signal S88, having moved straight ahead in the polarizing beard splitter 82, is supplied to the Faraday rotator 83 (a signal S89). This signal S89, whose plane of polarization is rotated 45° in the same direction as the signal S84 by the Faraday rotator 83, is brought to incidence on the polarization plane rotator 84 (signal S90). The signal S90, whose plane of polarization is rotated 45° by the polarization plane rotator 84, becomes a signal S91 of an S-polarized beam at the emitting end of the polarization plane rotator 84. The signal S91 is reflected by a right-angle prism 86, and brought to incidence on the polarizing beam splitter 85 (a signal S92). The signal S92, as it is a signal of an S-polarized beam, is turned at a right angle by the polarizing beam splitter 85, and, its signal components emerge at the port 8b but none at the port 8d. Therefore, all the components of the unpolarized optical signal S81 brought to incidence on the port 8a emerge at the port 8b as the signal By the same action as stated above, the optical signal supplied to the port 8c is outputted to the port 8d.

The Faraday rotator 83 rotates the plane of polarization of any optical signal coming incident from the polarization plane rotator 84 side in the direction reverse to the above stated. Therefore, optical signals coming incident from the ports 8b and 8d, after passing the polarizing beam splitter 85 and the right-angle prism 86, are supplied to the right-angle prism 81 and the polarizing beam splitter 82 without undergoing the rotation of their planes of polarization by the polarization plane rotator 84 and the Faraday rotator 83. As a result, an optical signal supplied to the port 8b is emitted to the port 8c, and one supplied to the port 8d, to the port 8a.

Figure 4:
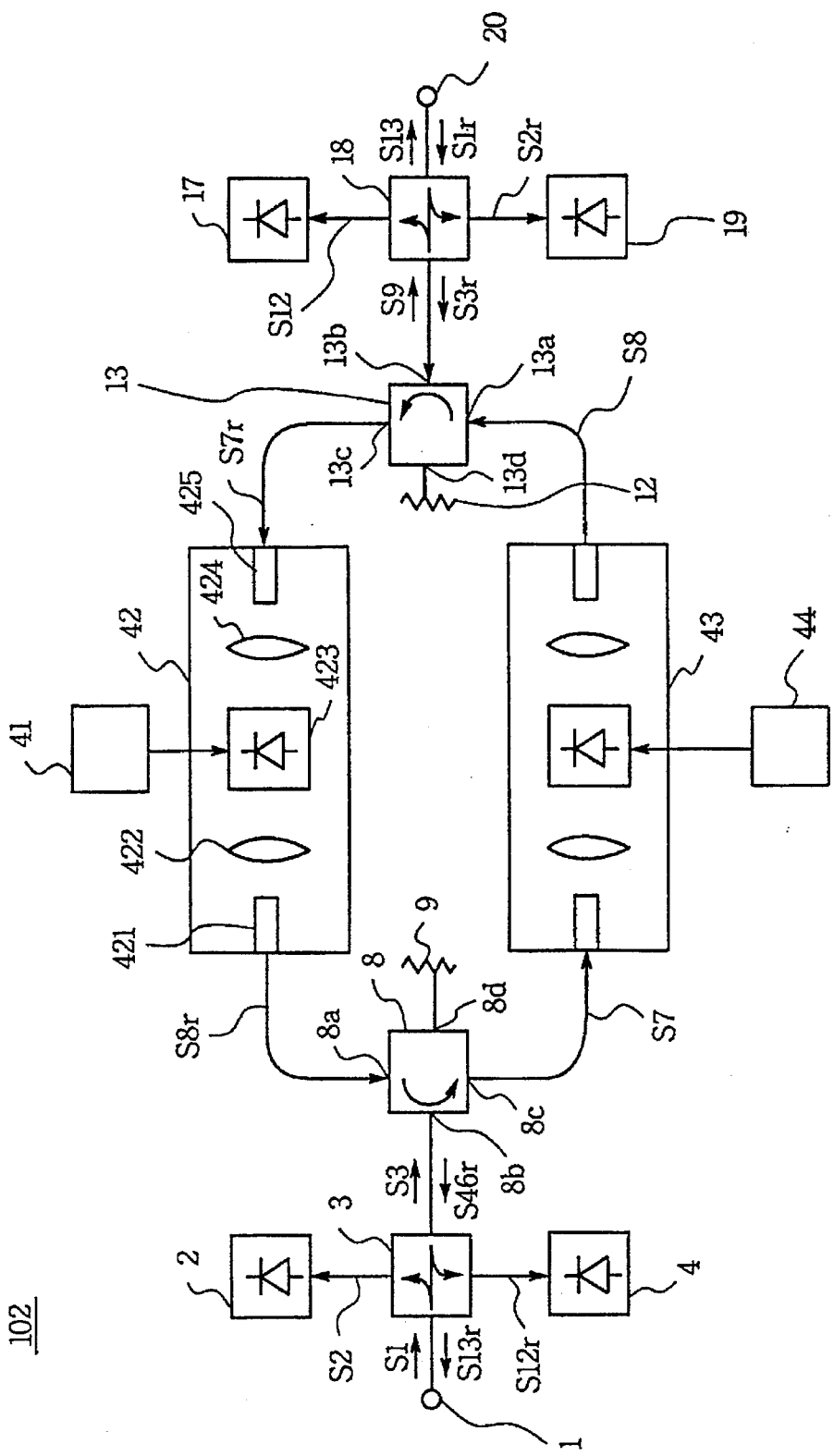
FIG. 4 is a block diagram of another preferred embodiment of the invention.

Referring to FIG. 4, an optical amplification-based two-way repeater 102 illustrated here has semiconductor laser modules 42 and 43, in place of the Er ion-doped optical fibers 10 and 11, respectively, of the preferred embodiment illustrated in FIG. 2, as amplifying media for the optical signals S7 and S7r. These semiconductor laser modules 42 and 43 undergo current excitation by current sources 41 and 44, respectively, to amplify the optical signals S7 and S7r. Therefore, in this two-way repeater 102, the pumping light sources 7 and 15, the optical multiplexers 6 and 14 and the optical filters 5 and 16, which are needed in the two-way repeater 101 of FIG. 2, are dispensed with, and the optical signals S3 from the optical branching circuit 3 and the optical signal S3r from the optical branching circuit 18 are directly entered into the optical circulators 8 and 13, respectively.

The semiconductor laser module 42 couples the inward optical signal S7r to an optical fiber 425, and couples an optical signal from this optical fiber 425 to the optical signal input end of a semiconductor laser element 423 with a lens 424. The semiconductor laser element 423, as it is excited by the pumping light source 41, amplifies the inputted optical signal S7r to cause it to emerge at an optical signal output end, and the optical signal emerging at this output end is supplied from an optical fiber 421 via a lens 422 as an optical signal S8r. The semiconductor laser module 43, like the aforementioned module 42, amplifies the outward optical signal S7 to cause an optical signal S8 to emerge at the optical signal output end.

This two-way repeater 102 of FIG. 4, though smaller in gain and saturation output than the two-way repeater 101 of FIG. 2, has the advantages of simple structure and permitting compact configuration. In the semiconductor laser module 42, the lenses 422 and 424 may be integrated with the optical fibers 421 and 425, respectively. By properly selecting the semiconductor laser modules 43 and 42, this optical amplifier based repeater 102 can be enabled to amplify the optical signals S1 and S1r having wavelengths of 1.3 and 1.5 microns, respectively.

Figure 5:
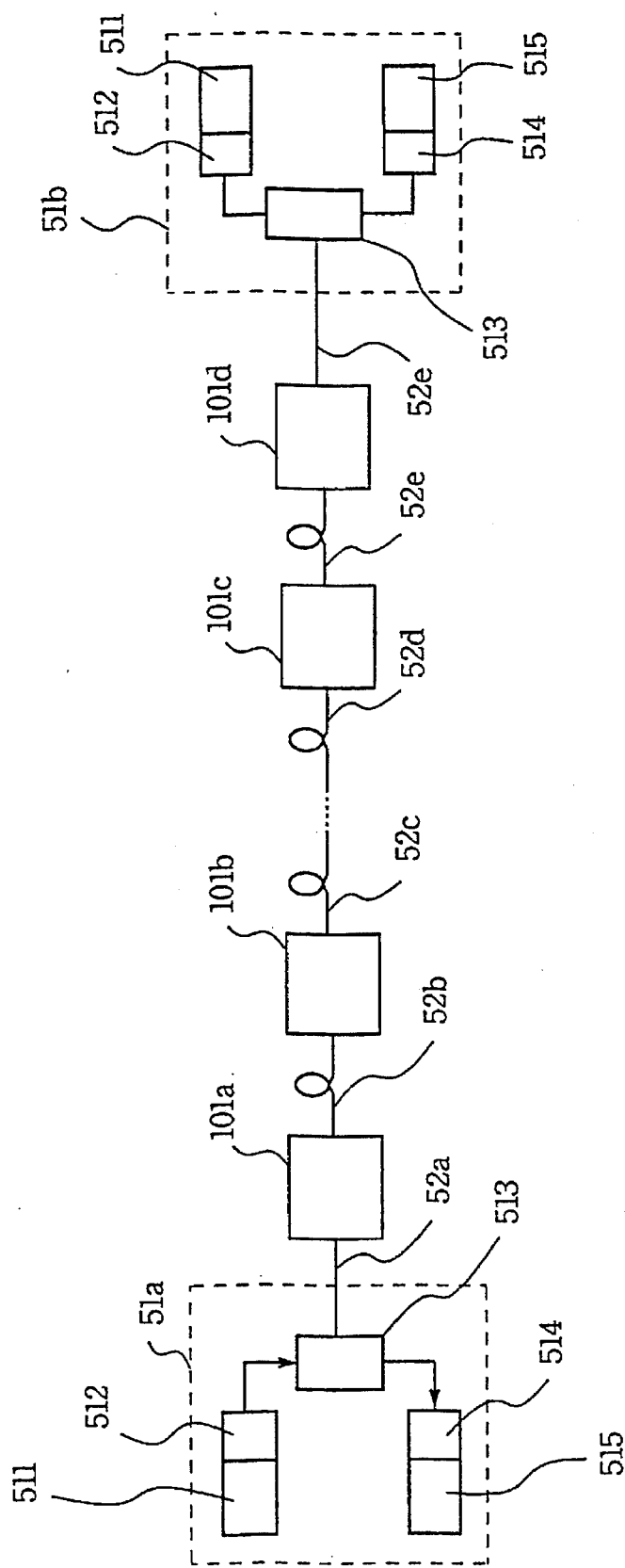
FIG. 5 is a diagram illustrating the configuration of a two-way optical fiber repeater system to which the embodiment of FIG. 2 is applied.

Referring to FIG. 5, a two-way optical fiber repeater system illustrated here is an optical fiber communication system having two optical transmitter/receiver units 51a and 51b of the same configuration as terminal stations, and these optical transmitter/receiver units 51a and 51b are connected in cascade with optical fibers 52a through 52e and optical repeaters 101a through 101d. Each of the optical repeaters 101a through 101d may be either the two-way repeater 101 shown in FIG. 2 or the two-way repeater 102 shown in FIG. 4. Where the relay distance in this two-way optical repeater system differs from one relay section to another (i.e. the lengths of the optical fibers 52a through 52e are different from one another), it is desirable to appropriately set the output levels of the inward and outward optical signals for each of the optical repeaters 101a through 101d according to the relay distance of each, and the use of said two-way repeaters 101 and 102 serves the purpose of this system.

In the optical transmitter/receiver unit 51a, a transmitting circuit 511 converts transmit data into a transmit signal appropriately coded for optical signal transmission through optical duplexer 513, and an optical transmitter 512 converts this coded transmit signal into an optical signal of 1.552 microns in wavelength. This optical signal is converted by an optical receiver 514 into an electric signal coded in the same form as said transmit signal. A receiving circuit 515 generates receive data from this electric signal.

The optical transmitter/receiver unit 51b, performing substantially the same operation as the optical transmitter/receiver unit 51a, receives an outward optical signal of 1.552 microns in wavelength from the optical fiber 52e and transmits an inward optical signal of 1.536 microns in wavelength to the optical fiber 52e.

As described above, the optical amplifier based two-way repeater (101 or 102) according to the present invention is provided with an amplifying medium for outward optical signals (the Er ion-doped optical fiber 11 or the semiconductor laser module 43) and an amplifying medium for inward optical signals (the Er ion-doped optical fiber 10 or the semiconductor laser module 42), and accomplishes the separation and multiplexing of these inward and outward optical signals with the first optical circulator 8 connected to the input end of the outward optical signal amplifying medium and to the output end of the inward optical signal amplifying medium and with the second optical circulator 13 connected to the output end of the outward optical signal amplifying medium and to the input end of the inward optical signal amplifying medium. Therefore, the reflection of optical signals and of pumping light can be reduced to thereby eliminate the deterioration of optical signals during their transmission due to oscillation or distortion.

Furthermore, since the two-way repeater according to the invention has separate amplifying medium for outward and inward optical signals, it allows the amplifying parameters of optical signals, such as the degree of amplification and saturation output, to be separately controlled for the outward and inward optical signals, and accordingly is suitable for use in two-way optical communication systems.

Although the invention has been described with reference to specific embodiments, this description is not meant to be construed in a limiting sense. Various modifications of the disclosed embodiments, as well as other embodiments of the invention, will become apparent to persons skilled in the art upon reference to the description of the invention. It is therefore contemplated that the appended claims will cover any such modifications or embodiments as fall within the true scope of the invention.

What is claimed is:

1. An optical, amplifier-based two-way repeater apparatus for a single optical fiber main transmission line, the apparatus including:
    first and second optical circulator means each provided with at least first, second and third ports, in which light is circulated sequentially from said first port to said second, third and again first ports in that direction;
    first optical signal transmitting means for supplying a first optical signal from a first signal input/output terminal to the second port of said first circulator means, and supplying an amplified second optical signal, available at said second port, to said first signal input/output terminal;
    first amplifying medium means connected to the third port of said first circulator means and to the first port of said second circulator means for amplifying said first optical signal emitted from the third port of said first circulator means and for providing an amplified signal to the first port of said second circulator means;
    first exciting means for exciting said first amplifying medium means;
    second optical signal transmitting means for supplying said second optical signal from a second signal input/output terminal to the second port of said second circulator means, and supplying said amplified first optical signal, available at said second port, to said first signal input/output terminal;
    second amplifying medium means connected to the third port of said second circulator means and to the first port of said first circulator means for amplifying said second optical signal emitted from the third port of said second circulator means and for providing an amplified signal to the first port of said first circulator means; and
    second exciting means for exciting said second amplifying medium means.

2. An optical amplifier-based two-way repeater apparatus, as claimed in claim 1, wherein the wavelength of said first optical signal and that of said second optical signal differ from each other.

3. An optical amplifier-based two-way repeater apparatus, as claimed in claim 1, wherein said first and second optical circulator means are three-port optical circulator means.

4. An optical amplifier-based two-way repeater apparatus, as claimed in claim 1, wherein each of said first and second optical circulator means is four-port circulator means further provided with a fourth port, in which light is circulated sequentially from said first port to said second, third, fourth and again first ports in that direction, and includes optical terminator means for terminating said fourth port.

5. An optical amplifier-based two-way repeater apparatus, as claimed in claim 2, wherein said first and second amplifying medium means are first and second rare earth element-doped optical fiber means, respectively, and
    said first and second exciting means are optically connected to said first and second rare earth element-doped optical fiber means, respectively, and are first and second pumping light supplying means for supplying first and second pumping lights to said first and second amplifying medium means, respectively.

6. An optical amplifier-based two-way repeater apparatus, as claimed in claim 5, wherein said first and second rare earth element-doped optical fiber means are first and second erbium ion-doped optical fiber means, respectively.

7. An optical amplifier-based two-way repeater apparatus, as claimed in claim 6, wherein said first and second pumping light supplying means are first and second semiconductor laser oscillators, respectively.

8. An optical amplifier-based two-way repeater apparatus, as claimed in claim 6, wherein said first optical signal transmitting means includes:
    first optical filter means, connected to said first signal input/output terminal, for passing said first and second optical signals and obstructing the passage of said first exciting light; and
    first optical multiplexer means, inserted between said first optical filter means and the second port of said first circulator means, for multiplexing said first optical signal from said first optical filter means and said first exciting light from said first pumping light source, and supplying the multiplexed signal to the second port of said first circulator means; and
    said second optical signal transmitting means includes:
    second optical filter means, connected to said second signal input/out terminal, for passing said first and second optical signals and obstructing the passage of said second exciting light; and
    second optical multiplexer means, inserted between said second optical filter means and the second port of said first circulator means, for multiplexing said second optical signal from said second optical filter means and said second pumping light from said second pumping light source, and supplying the multiplexed signal to the second port of said second circulator means.

9. An optical amplifier-based two-way repeater apparatus, as claimed in claim 8, wherein:
    said first optical signal transmitting means is inserted between said first signal input/output terminal and said first optical filter means and further includes first monitoring means for monitoring said first and second optical signals, and:
    said second optical signal transmitting means is inserted between said second signal input/output terminal and said second optical filter means and further includes second monitoring means for monitoring said first and second optical signals.

10. An optical amplifier-based two-way repeater apparatus, as claimed in claim 2, wherein said first and second amplifying medium means are first and second semiconductor laser amplifier means, respectively, and
    said first and second exciting means are respectively first and second current exciting means for current-exciting said first and second semiconductor laser amplifier means, respectively.

11. An optical amplifier-based two-way repeater apparatus, as claimed in claim 11, wherein:

said first optical signal transmitting means is inserted between said first signal input/output terminal and the second port of said first optical circulator means and further includes first monitoring means for monitoring said first and second optical signals, and:

said second optical signal transmitting means is inserted between said second signal input/output terminal and the second port of said second optical circulator means and further includes second monitoring means for monitoring said first and second optical signals.

12. An optical fiber transmission system provided with:

first optical transmitter/receiver circuit means for generating said first optical signal at said first optical signal input/output terminal and receiving said second optical signal at said first optical signal input/output terminal;

second optical transmitter/receiver circuit means for receiving said first optical signal at said second optical signal input/output terminal and generating said second optical signal at said second optical signal input/output terminal; and at least one two-way repeater apparatus, as claimed in claim 1, connected in cascade between said first and second optical signal input/output means via an optical fiber.

13. An optical fiber transmission system provided with:

first optical transmitter/receiver circuit means for generating said first optical signal at said first optical signal input/output terminal and receiving said second optical signal at said first optical signal input/output terminal;

second optical transmitter/receiver circuit means for receiving said first optical signal at said second optical signal input/output terminal and generating said second optical signal at said second optical signal input/output terminal; and at least one two-way repeater apparatus, as claimed in claim 6, connected in cascade between said first and second optical signal input/output means via an optical fiber.

14. An optical fiber transmission system provided with:

first optical transmitter/receiver circuit means for generating said first optical signal at said first optical signal input/output terminal and receiving said second optical signal at said first optical signal input/output terminal;

second optical transmitter/receiver circuit means for receiving said first optical signal at said second optical signal input/output terminal and generating said second optical signal at said second optical signal input/output terminal; and at least one two-way repeater apparatus, as claimed in claim 9, connected in cascade between said first and second optical signal input/output means via an optical fiber.

15. An optical fiber transmission system provided with:

first optical transmitter/receiver circuit means for generating said first optical signal at said first optical signal input/output terminal and receiving said second optical signal at said first optical signal input/output terminal;

second optical transmitter/receiver circuit means for receiving said first optical signal at said second optical signal input/output terminal and generating said second optical signal at said second optical signal input/output terminal; and at least one two-way repeater apparatus, as claimed in claim 11, connected in cascade between said first and second optical signal input/output means via an optical fiber.

* * * * *